United States Patent
Taniguchi et al.

(10) Patent No.: US 7,131,290 B2
(45) Date of Patent: Nov. 7, 2006

(54) NON-CONDENSING GAS DISCHARGE DEVICE OF CONDENSER

(75) Inventors: Hiroyoshi Taniguchi, Wako (JP); Makoto Uda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 10/952,912

(22) Filed: Sep. 30, 2004

(65) Prior Publication Data

US 2005/0072185 A1    Apr. 7, 2005

(30) Foreign Application Priority Data

Oct. 2, 2003   (JP)   ............................. 2003-344492
Oct. 20, 2003  (JP)   ............................. 2003-359850

(51) Int. Cl.
  *F25B 5/00*   (2006.01)
  *F25B 43/00*  (2006.01)
(52) U.S. Cl. .......................................... 62/475; 62/512
(58) Field of Classification Search .................. 62/512, 62/475
  See application file for complete search history.

(56) References Cited

U.S. PATENT DOCUMENTS 4,175,398 A * 11/1979 Edwards et al. .............. 62/172
5,623,833 A *  4/1997 Mitchell et al. ................ 62/85

FOREIGN PATENT DOCUMENTS

JP    63-47751 Y2   12/1988
JP    2002-115504 A   4/2002

* cited by examiner

*Primary Examiner*—Melvin Jones
(74) *Attorney, Agent, or Firm*—Birch, Stewart, Kolasch & Birch, LLP

(57) ABSTRACT

Gaseous-phase portion of a condenser contains vapor and a non-condensing gas, such as air, that impedes condensation of the vapor, and a non-condensing gas discharge device of the condenser is arranged to discharge only the non-condensing gas from the condenser. The non-condensing gas discharge device includes a valve device, in the form of an air vent, for separating the non-condensing gas from the vapor and selectively discharging only the non-condensing gas from the condenser.

7 Claims, 11 Drawing Sheets

FIG. 4

FIG.14A
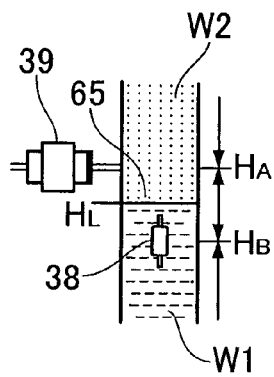
FIG.14B
| LIQUID LEVEL POSITION | AIR VENT | RETURN PUMP |
|---|---|---|
| HIGHER THAN $H_A$ | OPENED | OFF |
| BETWEEN $H_A$ & $H_B$ | CLOSED | OFF |
| LOWER THAN $H_B$ | CLOSED | ON |
FIG.15
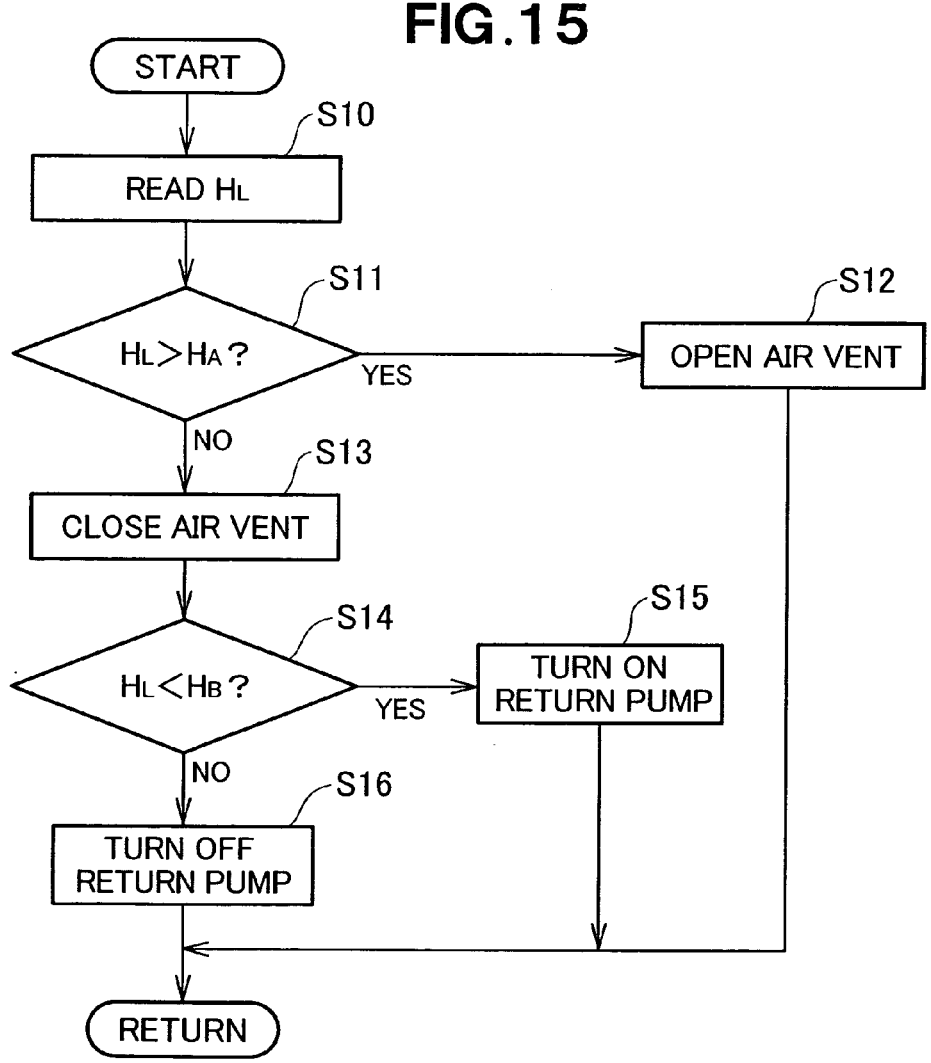

NON-CONDENSING GAS DISCHARGE DEVICE OF CONDENSER

This Non-provisional application claims priority under 35 U.S.C. §119(a) on Patent Application No(s). 2003-344492 and 2003-359850 filed in Japan on Oct. 2, 2003 and Oct. 20, 2003, respectively, the entire contents of which are hereby incorporated by reference.

FIELD OF THE INVENTION

The present invention relates generally to non-condensing (or non-condensable) discharge devices of condensers. More particularly, the present invention relates to an improved non-condensing gas discharge device of a condenser in a Rankine cycle apparatus which is used, for example, as a vehicle-mounted apparatus for converting exhaust heat energy of a vehicle-mounted engine into mechanical energy.

BACKGROUND OF THE INVENTION

Rankine cycle apparatus have been known as systems for converting heat energy into mechanical work. The Rankine cycle apparatus include a structure for circulating water as a working medium, in the liquid- and gaseous-phase states within a sealed piping system forming a circulation system in the apparatus. Generally, the Rankine cycle apparatus include a water supplying pump unit, an evaporator, an expander, a condenser, and pipes connecting between these components to provide circulation circuitry.

FIG. 17 hereof is a schematic block diagram of a general setup of a conventionally-known Rankine cycle apparatus (e.g., vehicle-mounted Rankine cycle apparatus) and certain details of a condenser employed in the Rankine cycle apparatus. The Rankine cycle apparatus of FIG. 17 includes a water supplying pump unit 110, an evaporator 111, an expander 107, and the condenser 100. These components 110, 111, 107 and 100 are connected via pipes 108 and 115, to provide circulation circuitry in the apparatus.

Water (liquid-phase working medium), which is supplied, a predetermined amount per minute, by the water supplying pump unit 110 via the pipe 115, is imparted with heat by the evaporator 111 to turn into water vapor (gaseous-phase working medium). The vapor is delivered through the next pipe 115 to the expander 107 that expands the water vapor. Mechanical device (not shown) is driven through the vapor expansion by the expander 107 so as to perform desired mechanical work.

Then, the expanded water vapor is delivered through the pipe 108 to the condenser 100, where the vapor is converted from the vapor phase back to the water phase. After that, the water is returned through the pipe 115 to the water supplying pump unit 110, from which the water is supplied again for repetition of the above actions. The evaporator 111 is constructed to receive heat from an exhaust pipe extending from the exhaust port of the engine of the vehicle. Among various literatures and documents showing structural examples of the Rankine cycle apparatus is Japanese Patent Application Laid-open Publication No. 2002-115504.

The following paragraphs detail a structure and behavior of the condenser 100 in the conventional vehicle-mounted Rankine cycle apparatus, with reference to FIGS. 17 to 19.

The condenser 100 includes a vapor introducing chamber 101, a water collecting chamber 102, and a multiplicity of cooling pipes 103 vertically interconnecting the two chambers 101 and 102. In FIG. 17, only one of the cooling pipes 103 is shown in an exaggerative manner. Substantial upper half of the interior of each of the cooling pipes 103 is a vapor (gaseous-phase) portion 104 (i.e., portion occupied with the vapor 104), while a substantial lower half of the interior of the cooling pipe 103 is a water (liquid-phase) portion 105 (i.e., portion occupied with the water 105). In the vapor (gaseous-phase) portion 104, most of the working medium introduced via the vapor introducing chamber 101 to the cooling pipe 103 is in the gaseous phase, while, in the water portion 105, most of the working medium flowing through the cooling pipe 103 is kept in the liquid (condensed water) phase. Boundary between the vapor 104 and the water 105 (i.e., gas-liquid interface) is a liquid level position 112.

One cooling fan 106 is disposed behind the cooling pipes 103 (to the right of the cooling pipes 103 in FIG. 17). The cooling fan 106 is surrounded by a cylindrical shroud 106a. Normally, operation of the cooling fan 106 is controlled by an electronic control unit on the basis of a water temperature at an outlet port of the condenser 100. The single cooling fan 106 sends air to the entire region, from top to bottom, of all of the cooling pipes 103 to simultaneously cool the cooling pipes 103.

The condenser 100 operates as follows during operation of the Rankine cycle apparatus. Water vapor of a relatively low temperature, discharged from the expander 107 with a reduced temperature and pressure, is sent into the vapor introducing chamber 101 of the condenser 100 via the low-pressure vapor pipe 108 and then directed into the cooling pipes 103. Cooling air 109 drawn into the cooling fan 106 is sent to the condenser 100.

Strong cooling air is applied by the cooling fan 106 to the upstream vapor portion 104 of the condenser 100, i.e. a portion of each of the cooling pipes 103 where a mixture of the vapor and water exists, and thus latent heat emitted when the vapor liquefies can be recovered effectively by the cooling air. Cooling air is also applied by the cooling fan 106 to the downstream water portion 105 of the condenser 100, i.e. a portion of each of the cooling pipes 103 where substantially only the water exists. Water condensed within the cooling pipes 103 of the condenser 100, is collected into the water collecting chamber 102 and then supplied by the water supplying pump unit 110 to the evaporator 111 in a pressurized condition as noted above.

In FIG. 17, reference numeral 116 represents a surface area of a condensing heat transmission portion, and 117 represents a surface area of a heat transmission portion of the condensed water. The surface areas 116 and 117 of the heat transmission portions and the liquid level position 112 have the following relationship.

The conventional Rankine cycle apparatus 100 inherently has the characteristic that the liquid fluid position 112 varies. Namely, because the engine output varies in response to traveling start/stop and transient traveling velocity variation of the vehicle, the amount of water supply to the evaporator 111 also varies, in response to which the liquid level position 112 within the condenser 100 varies. Namely, in the condenser 100, the liquid level position 112 rises when the amount of the vapor flowing into the condenser 100 (i.e., inflow amount of the vapor) is greater than the amount of the condensed water discharged from the condenser 100 (i.e., discharge amount of the condensed water), but lowers when the inflow amount of the vapor is smaller than the discharge amount of the condensed water. In this way, the vapor-occupied portion 104 in the cooling pipes 103 of the condenser 100 increases or decreases. Because the condensed water (in the portion 105) is discharged from the water supplying pump unit 110 subjected to predetermined flow rate control, a pressure from an outlet port 113 of the expander 107 to an inlet port 114 of the water supplying pump unit 110 is determined by a pressure within the condenser 100. The pressure within the condenser 100 is determined by an amount of condensing heat exchange caused by cooling of the vapor portion 104 of the condenser, and the amount of condensing heat exchange is determined by a flow rate of the medium to be cooled and a surface area of the condensing heat transmission portion 116. Thus, if the portion occupied with the vapor increases or decreases due to variation (rise or fall) of the liquid level position 112, the surface area 116 of the condensing heat transmission portion increases or decreases and so the pressure within the condenser 100 and the flow rate of the medium to be cooled do not uniformly correspond to each other any longer.

Similarly, the temperature of the condensed water at the outlet port of the condenser 100 is determined by an amount of heat exchange caused by cooling of the water portion 105 of the condenser, and the amount of the heat exchange of the condensed water is determined by the flow rate of the medium to be cooled and a surface area 117 of a heat transmission portion of the condensed water. Thus, if the portion occupied with the condensed water 105 increases or decreases due to variation (rise or fall) of the liquid level position 112, the surface area 117 of the heat transmission of the condensed water portion increases or decreases and so the temperature of the condensed water and the flow rate of the medium to be cooled do not uniformly correspond to each other any longer.

In the Rankine cycle apparatus where water is used as the working medium, the saturation pressure, at an atmospheric temperature, of the water within the circulation system is lower than the atmospheric pressure, and so the interior of the circulation system would assume a negative pressure after deactivation of the Rankine cycle apparatus as the entire apparatus is cooled. Thus, a non-condensing (i.e., non-condensable) gas, such as air, would enter the interior of the circulation system through sealed portions of various components and joints between the pipes. Further, where the working medium used has a saturation pressure at an atmospheric temperature greater than the atmospheric pressure, and if the working medium is contained in the circulation system in poor filling condition, the non-condensing gas, such as air, would remain within the circulation system of the apparatus.

If the Rankine cycle apparatus is operated with the non-condensing gas present or contained within the circulation system of the Rankine cycle apparatus, the non-condensing gas would enter the condenser 100 along with a flow of vapor. In such a case, the vapor 104 having entered the condenser 100 condenses within the condenser 100 and is discharged as condensed water 105, as illustrated in FIG. 18. On the other hand, the non-condensing gas 121, having flown into the condenser 100, would build up or accumulate within the condenser 100 due to its con-condensable characteristic. Because the flow of the vapor 104 from the expander 107 to the condenser 100 is present in an upstream region of the condenser 100, the non-condensing gas 121 is carried, by the flow of the vapor 104, to a lower area of the vapor portion 104 within the condenser 100. In other words, the circulation system is formed systematically, in the Rankine cycle apparatus, by the flows of the water and vapor as illustrated in FIG. 17, and the non-condensing gas too flows into the circulation system in accordance with the flow of the vapor 104 through the pipe 108 extending from the expander 107 to the condenser 100.

The condensable vapor 104 condenses by the condensing operation of the condenser 100 and is discharged from the condenser 100 as condensed water 105. The non-condensing gas, on the other hand, does not condense and would therefore remain within the condenser 100 in the gaseous-phase state while being subjected to the vapor flow. As a consequence, the non-condensing gas would remain in the lower area of the vapor portion 104 within the condenser 100 as denoted at 121 in FIGS. 18 and 19.

Further, because the interior of the condenser 100 is placed in conditions such that the air density is greater than the vapor density, air would accumulate in the lower area of the vapor portion 104 due to the action of gravity. Actually, in the boundary between the gaseous-phase portion 118 (corresponding to the vapor portion 104) and the liquid-phase portion 119 (corresponding to the water portion 105), there would be produced water and condensate liquid membrane 105a as illustrated in FIG. 19. The non-condensing gas 121 is surrounded by the water 105 and condensate liquid membrane 105a and pressed in an upstream-to-downstream direction by the flow of saturated vapor 104. As a consequence, the non-condensing gas (i.e., air) 121 having a greater density than the vapor 104 would be accumulated in the lower area of the gaseous-phase portion (i.e., condensing heat trans-mission portion) within the condenser 100. Thus, in the lower area of the gaseous-phase portion within the condenser 100, as illustrated in FIGS. 18 and 19, the non-condensing gas 121 would become a resistance to impede passage of the saturated vapor 104 supplied from upstream, and so there would be formed an area 122 where the saturated vapor 104 can never reach or can only reach with difficulty. In the area 122, no heat exchange can be effected, so that the heat transmission area 116 for the vapor 104 to condense would decrease. As a consequence, the operating efficiency of the condenser 104 would decline significantly.

Therefore, a particular mechanism is required to discharge the non-condensing gas 121 accumulated within the condenser 100. Japanese Utility Model Publication No. SHO-63-47751 discloses a heat exchange apparatus for an automotive vehicle engine, which is designed to reduce a temperature difference between upwind and downwind portions of cooling air of the heat exchanger and control opening/closing of an electronic magnetic valve, provided in a tank beneath the heat exchanger, to discharge the non-condensing gas when the working medium has reached a high temperature. However, in the disclosed heat exchange apparatus, the opening/closing of the electronic magnetic valve is controlled on the basis of the temperature condition alone. Therefore, even vapor that can not be differentiated on the basis of the temperature condition would be undesirably discharged, and thus it was difficult to selectively discharge only the non-condensing gas accumulated in the lower are of the gaseous-phase portion 116.

For the foregoing reasons, there has been a great demand for an improved non-condensing gas discharge device of a condenser which can reliably separate the non-condensing gas, remaining within the condenser and impeding condensation of the vapor, from the vapor and thus selectively discharge only the non-condensing gas so that the gaseous-phase portion of the condenser is filled only with the vapor, to thereby achieve an enhanced condensing efficiency and permit efficient heat exchange on the entire heat transmitting surface of the gaseous-phase portion.

SUMMARY OF THE INVENTION

According to one aspect of the present invention, there is provided a non-condensing gas discharge device of a condenser, which comprises: a gaseous-phase portion containing a condensable gaseous-phase working medium and a non-condensing gas; a liquid-phase portion containing a liquid-phase working medium; a cooling section for cooling the working media to convert the gaseous-phase working medium back to the liquid phase; and a valve device, operatively connected with (or provided in correspondence with) a part of the gaseous-phase portion near a liquid level of the liquid-phase working medium along a boundary between the gaseous-phase portion and the liquid-phase portion, for separating the non-condensing gas from the gaseous-phase working medium and thereby discharging only the non-condensing gas from the condenser.

The non-condensing gas discharge device of the present invention separates the non-condensing gas (such as air), remaining within the condenser, from the gaseous-phase working medium (such as vapor) and thus selectively discharges only the separated non-condensing gas from the condenser. Thus, the non-condensing gas discharge device allows the gaseous-phase portion to be filled with the vapor and thereby allows a high condensing efficiency of the condenser to be maintained and even enhanced effectively utilizing the heat transmission area of the heat transmission portion. Namely, by means of the valve device, the non-condensing gas discharge device of the present invention can selectively discharge, on a timely basis, only the non-condensing gas (such as air) in separated relation from the gaseous-phase working medium (such as vapor), thereby allowing the high condensing efficiency to be maintained with good response.

Preferably, the valve device in the present invention is shifted to its opened position (i.e., valve-opening position) at a temperature lower than the boiling temperature of the liquid-phase working medium (such as water), so as to discharge the non-condensing gas of a temperature lower than the boiling temperature. Thus, only the non-condensing gas can be discharged via the valve device, without the gaseous-phase working medium (vapor), higher in temperature than the boiling temperature of the liquid-phase working medium (water), being discharged via the valve device. Further, if, for example, the valve device is set at a low valve-opening temperature with a predetermined difference from a saturated vapor temperature, the present invention can selectively discharge only the non-condensing gas from the condenser, without discharging the vapor, while effectively preventing the non-condensing gas from accumulating within the condenser.

Further, preferably, the condenser includes a plurality of condensing pipes and an intermediate chamber communicating with the plurality of condensing pipes, and the valve device is operatively connected with (or provided in correspondence with) the intermediate chamber. This inventive arrangement can minimize the number of the valve device to be used and permits shared use of the valve device among the plurality of condensing pipes, with the result that the present invention can effectively prevent the non-condensing gas from staying and accumulating non-uniformly across the condenser and can thereby discharge the non-condensing gas in a stabilized manner.

In another preferred embodiment of the invention, the condenser includes a plurality of condensing pipes, and the valve device is provided in each of the plurality of condensing pipes.

In an embodiment of the invention, the liquid-phase working medium is water, the gaseous-phase working medium is vapor, and the non-condensing gas is air.

Further, preferably, the valve device in the present invention has an outlet for discharging the water, and the liquid level of the water lies below the outlet. The valve device is constantly operatively connected with the gaseous-phase portion lying immediately above and close to the liquid level and set to operate at any time, so that it can be brought to its opened position on a timely basis and thereby allows the condenser to keep up its high condensing efficiency.

Further, in the present invention, the valve device is preferably in the form of an air vent.

As set forth above, the present invention is characterized by separating, from the vapor, the non-condensing gas that impedes condensation of the vapor and discharging only the thus-separated non-condensing gas from the condenser, to thereby allow the gaseous-phase portion of the condenser to be filled with the vapor; thus, the condenser can maintain its high condensing efficiency and even enhance the condensing efficiency. The non-condensing gas having a higher density than the gaseous-phase working medium (vapor) would stay and accumulate in the lower area of the gaseous-phase portion of the condenser near the liquid level due to the flow of the gaseous-phase working medium (vapor) and action of gravity. However, in the present invention, the valve device, which is brought to its opened position to selectively discharge only the non-condensing gas at a temperature lower than the boiling temperature of the liquid-phase working medium (e.g., temperature lower than the temperature of saturated vapor), is operatively connected with the lower area of the gaseous-phase portion. In this way, the present invention allows the condenser to maintain its high condensing efficiency with good response while effectively preventing undesired discharge of the gaseous-phase working medium (vapor) from the condenser.

BRIEF DESCRIPTION OF THE DRAWINGS

Certain preferred embodiments of the present invention will hereinafter be described in detail, by way of example only, with reference to the accompanying drawings, in which:

FIG. 4 is a block diagram showing a system setup of the Rankine cycle apparatus, which particularly shows flows of a working medium in the apparatus of FIG. 1;

FIGS. 14A and 14B are a view and table explanatory of details of liquid level position settings;

FIG. 15 is a flow chart showing an operational flow of a liquid level position control of the condenser;

DETAILED DESCRIPTION OF THE PREFERRED EMBODIMENTS

Figure 1:
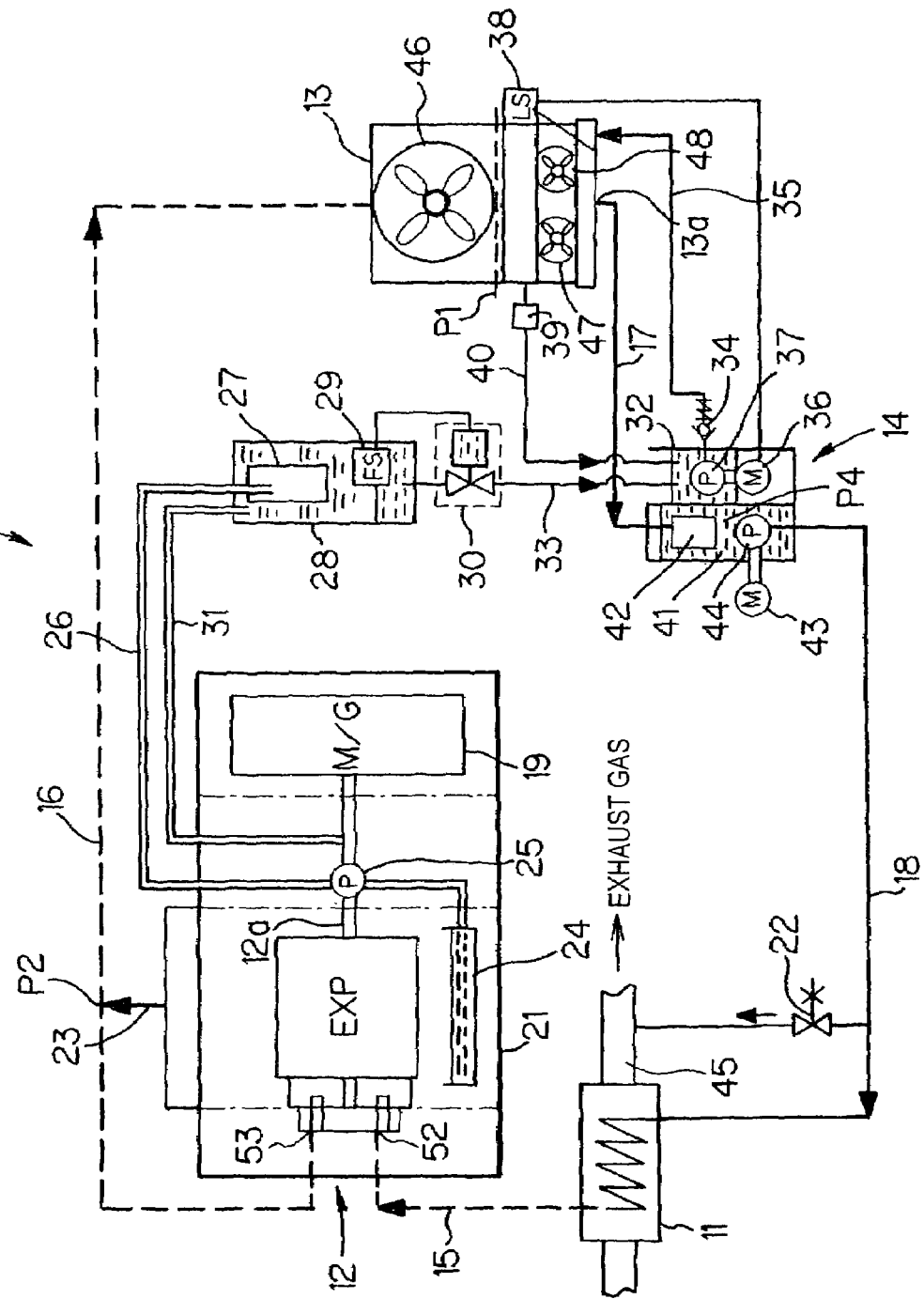
FIG. 1 is a block diagram showing a general system setup of a Rankine cycle apparatus in accordance with an embodiment of the present invention.

First, a description will be made about an example general setup of a Rankine cycle apparatus in accordance with an embodiment of the present invention, with reference to FIG. 1.

The Rankine cycle apparatus 10 includes an evaporator 11, an expander 12, a condenser 13, and a water supplying pump unit 14 provided with a supply pump.

The evaporator 11 and the expander 12 are interconnected via a pipe 15, and the expander 12 and the condenser 13 are interconnected via a pipe 16. Further, the condenser 13 and the water supplying pump unit 14 are interconnected via a pipe 17, and the water supplying pump unit 14 and the evaporator 11 are interconnected via a pipe 18. With such a piping structure, there is formed closed circulation circuitry (circulation system) through which a working medium is circulated within the Rankine cycle apparatus 10 in the gaseous or liquid phase. The working medium in the Rankine cycle apparatus 10 is in water (liquid) and water vapor (gaseous) phases.

The circulation circuitry of the Rankine cycle apparatus 10 has a circulating structure hermetically sealed from the outside, which allows water or vapor to circulate therethrough.

In the circulation circuitry of the Rankine cycle apparatus 10, the water (liquid-phase working medium) travels from a liquid level position, indicated by a broken line P1, within the condenser 13, through the water supplying pump unit 14, to the evaporator 11. In FIG. 1, the pipes 17 and 18, through which the water travels, are indicated by thick solid lines. The vapor (gaseous-phase working medium) travels from the evaporator 11, through the expander 12, to the liquid level position P1 within the condenser 13. The pipes 15 and 16, through which the vapor travels, are indicated by thick broken lines.

The Rankine cycle apparatus 10 is constructed to phase-convert water into water vapor using heat from a heat source, and produce mechanical work using expansion of the water vapor. The evaporator 11 is a mechanism for converting water into vapor.

As will be later described in detail, the Rankine cycle apparatus 10 is constructed as a vehicle-mounted apparatus suitable for mounting on an automotive vehicle. For that purpose, the evaporator 11 uses heat of exhaust gas from the vehicle engine as the heat source. Namely, the evaporator 11 uses heat of the exhaust gas, flowing through an exhaust pipe 45 of the engine (internal combustion engine), to heat and superheat water supplied from the water supplying pump unit 14, so as to produce high-temperature and high-pressure water vapor. The high-temperature and high-pressure water vapor produced by the evaporator 11 is supplied to the expander 12.

Needless to say, the evaporator 11 may use higher-temperature exhaust gas from an exhaust port, exhaust manifold (not shown) or the like located downstream of an exhaust valve of the engine, rather than from the exhaust pipe 45.

The expander 12 has an output shaft 12a connected to the rotor (not shown) or the like of a motor/generator (M/G) 19 so as to allow the motor/generator (M/G) 19 to operate as a generator. The expander 12 is constructed to expand the high-temperature and high-pressure water vapor supplied from the evaporator 11 and rotates the output shaft 12a through the expansion of the vapor. The rotation of the output shaft 12a rotates the rotor of the motor/generator 19 to cause the motor/generator 19 to make predetermined mechanical rotation or perform predetermined power generation operation. The output shaft 12a of the expander 12 is also connected to a hydraulic pump 25 to drive the pump 25.

As noted above, the expander 12 produces mechanical work through the expansion of the high-temperature and high-pressure water vapor supplied from the evaporator 11 via the pipe 15 and thereby drives various loads, such as the motor/generator 19 and hydraulic pump 25. The vapor 12 discharged from the evaporator 12 decreases in temperature and pressure and is delivered via the pipe 16 to the condenser 13 with the decreased temperature and pressure.

The condenser 13 cools and liquefies the vapor delivered from the evaporator 12. Water produced through the liquefaction by the condenser 13 (i.e., condensed water) is returned via the pipe 17 to the water supplying pump unit 14.

High-pressure pump 44 of the water supplying pump unit 14 pressurizes the water liquefied by the condenser 13 (i.e., condensed water from the condenser 13) and re-supplies or replenishes the pressurized condensed water to the evaporator 11.

The Rankine cycle apparatus 10 having the above-described general system setup includes the following as other relevant components.

In a portion of the pipe 18 near the evaporator 11, there is provided a pressure relief valve 22 for adjusting a pressure within the pipe 18 in response to pressure variation within the pipe 18.

Within a casing 21 of the expander 12, there is provided a breather (separator) 23 for returning leaked water vapor to the pipe 16. Further, within the casing 21, an oil pan 24 is disposed under the expander 12. Oil built up in the oil pan 24 with water mixed therein is delivered by the hydraulic pump 25 to an oil coalescer 27 via a pipe 26.

The oil and water are separated from each other by the oil coalescer 27, and the separated water is stored in a lower portion of an oil tank 28 due to a difference in specific gravity. Valve mechanism 30 operating on the basis of a float sensor 29 is mounted in the oil tank 28.

The oil separated from the water by the oil coalescer 27 and stored in an upper portion of the oil tank 28 is supplied, through a pipe 31, to various sections of the expander 12 by way of an oil path (not shown) formed in the output shaft 12a.

The water stored or accumulated in the lower portion of the oil tank 28 is supplied, via a pipe 33, to an open tank 32 of the water supplying pump unit 14 through operation of the valve mechanism 30. The open tank 32 is so named because it is open to the atmospheric air, and it accumulates or stores therein the working medium, leaked or discharged out of the circulation circuitry, in the liquid-phase state.

The open tank 32 of the water supplying pump unit 14 and the condenser 13 are interconnected by a pipe 35 via a water supplying return pump 37 and check valve 34.

The condenser 13 includes a liquid level sensor 38 and air vent 39 provided near the liquid level position. Water supply from the open tank 32 to the condenser 13 is performed by the water supplying return pump 37 that is driven by a motor 36 turned on/off in response to a signal from the liquid level sensor 38. Further, the open tank 32 and the condenser 13 are inter-connected by a pipe 40 that discharges the water via the air vent 39.

The pipe 17 for returning the condensed water discharged from the condenser 13 is connected to a water coalescer 42 within a sealed tank 41 of the pump unit 14. Water in the sealed tank 41 is supplied, by the high-pressure water supplying pump 44 driven by a motor 43, to the evaporator 11 via the pipe 18.

Further, in association with the condenser 13, there are provided a plurality of cooling fans 46–48 for generating cooling air independently for different portions of the condenser 13.

In the above-described arrangements, a working medium supply device is constituted by elements pertaining to the liquid level position within the condenser 13 and lower section of the condenser 13 and by the water supplying pump unit 14.

In a sealed working medium circulation system of the Rankine cycle apparatus 10, a working medium leaked from the breather 23 of the expander 12 is returned via an outlet port P2 to the pipe 16 of the circulation system.

Figure 2:
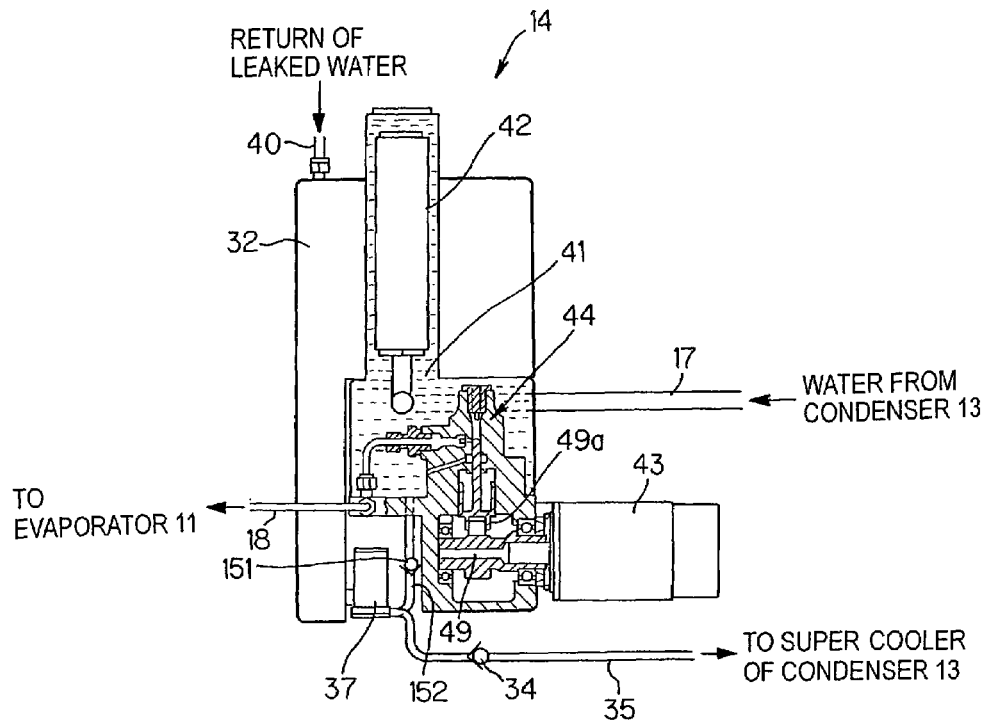
FIG. 2 is a sectional view illustrating an inner structure of a water supplying pump unit of FIG. 1.

FIG. 2 is a view showing an example specific structure of the water supplying pump unit 14.

The water supplying pump unit 14 comprises the water coalescer 42, sealed tank 41, high-pressure water supplying pump 44 driven by the drive motor 43, open tank 32, return pump 37, and check valve 34.

Although a rotation shaft 49 of the drive motor 43 is shown in the figure as being parallel to the surface of the sheet of the drawing, this is just for convenience of illustration; in practice, the rotation shaft 49 is disposed perpendicularly to the sheet of the drawing. The rotation shaft 49 of the drive motor 43 is held in engagement with a cam mechanism 49a, so as to function as a cam shaft.

The water coalescer 42 separates oil and water, and the sealed tank 41 directly collects leaked water from the high-pressure water supplying pump 44. The high-pressure water supplying pump 44 supplies a required amount of water by performing water amount control based on the number of pump rotations.

The open tank 32 is provided for temporarily storing water leaked out of the circulation circuitry. The return pump 37 returns the leaked water to the sealed tank 41 or to a supercooler of the condenser 13. Namely, the return pump 37 returns the leaked water from the open tank 32 to the closed tank 41 through a pipe 152 equipped with a check valve 151, or delivers the water to the supercooler of the condenser 13 through the pipe 35 equipped with the check valve 34 as necessary. The check valve 151 of the pipe 152 prevents a reverse flow of the water from the sealed tank 41, and the check valve 34 of the pipe 35 prevents a reverse flow of the water from the supercooler of the condenser 13.

Water discharged from the outlet port 13a (see FIG. 1) of the condenser 13 is passed through the water coalescer 42 via the pipe 17 so that the water is separated from oil and only the water is fed to the high-pressure water supplying pump 44 driven by the drive motor 43. The high-pressure water supplying pump 44 delivers the water to the evaporator 11 via the pipe 18. Leaked water is returned via the pipe 40 to the open tank 32.

Figure 3:
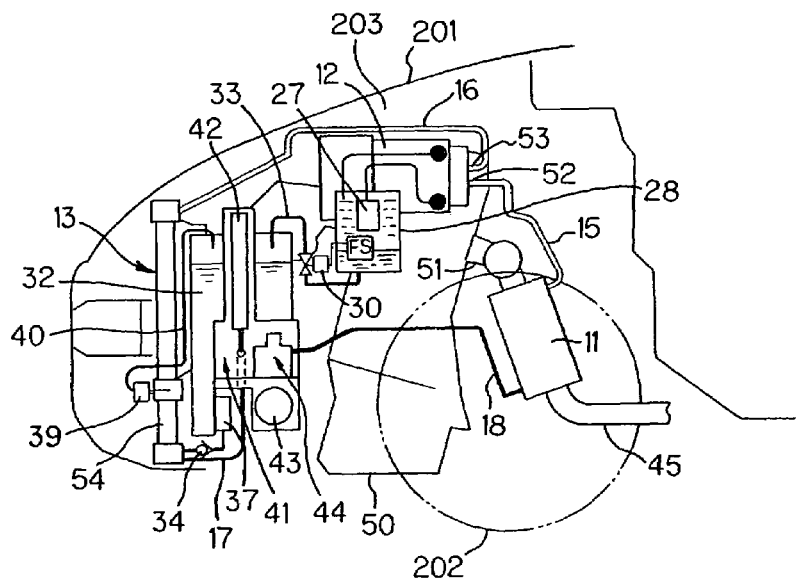
FIG. 3 is a view illustrating example layout of various components of the Rankine cycle apparatus of FIG. 1 when mounted on a vehicle.

The following paragraphs describe the Rankin cycle apparatus 10 when mounted on the vehicle, with reference to FIG. 3.

In FIG. 3, reference numeral 201 indicates a front body of the vehicle, and 202 a front road wheel. Engine room 203 is formed within the front body 201, and the engine 50 is mounted in the engine room 203. The exhaust manifold 51 is provided on a rear surface of the engine 50, and the above-mentioned exhaust pipe 45 is connected to the exhaust manifold 51.

The evaporator 11 is mounted on a portion of the exhaust pipe 45 near the exhaust manifold 51. The pipe 18 extending from the high-pressure water supplying pump 44 is coupled to the evaporator 11, and the pipe 18 supplies water to the evaporator 11 using, as its heat source, the heat of exhaust gas from the high-pressure water supplying pump 44. The evaporator 11 phase-converts the water into water vapor using the heat of the exhaust gas and supplies the converted vapor to the expander 12 via the pipe 15 connected to a vapor inlet port 52 of the expander 12. The expander 12 converts expansion energy of the water vapor into mechanical energy.

The expander 12 has a vapor outlet port 53 connected to the pipe 16, and the condenser 13 for cooling/condensing water vapor into water is disposed between the pipe 16 and the sealed tank 41 leading to an inlet side of the high-pressure water supplying pump 44. The condenser 13 is located in a front area of the engine room 203. In FIG. 3, there is also shown a layout of the open tank 32, water coalescer 42, return pump 37, oil coalescer 27, super cooler 54 (liquid-phase portion of the condenser 13), air vent 39, check valve 34, etc. As note above, the high-pressure water supplying pump 44, evaporator 11, expander 12, condenser 13, etc. together constitute the Rankine cycle apparatus for converting heat energy into mechanical energy.

Behavior of the Rankine cycle apparatus is explained below in the order that corresponds to flows of water and water vapor within the Rankine cycle apparatus.

Water cooled and condensed in the condenser 13 is supplied, in a pressurized condition, by the high-pressure water supplying pump 44 to the evaporator 11 via the pipe 18.

The water, which is a liquid-phase working medium, is heated by the evaporator 11 imparting the water with heat energy until it becomes high-temperature and high-pressure water vapor, and the resultant high-temperature and high-pressure water vapor is supplied to the expander 12. The expander 12 converts the heat energy into mechanical energy through expanding action of the high-temperature and high-pressure water vapor, and the mechanical energy is supplied to the motor/generator 19 annexed to the expander 12.

The water vapor let out from the expander 12 assumes a lowered temperature and pressure, which is then delivered to the condenser 13. The water vapor of lowered temperature and pressure delivered to the condenser 13 is again cooled and condensed in the condenser 13, and the resultant condensed water is supplied via the water coalescer 42 to the high-pressure water supplying pump 44. After that, the water, which is a liquid-phase working medium, repeats the above circulation, so that the expander 12 continues to be supplied with water vapor of high temperature and pressure.

Next, with reference to FIGS. 5–16, a description will be made about a mechanism for discharging air (non-condensable or non-condensing gas) remaining within the condenser 13 of the Rankine cycle apparatus 10, as well as control of the liquid level position of water accumulated in the condenser 13 of the Rankine cycle apparatus 10.

Figure 4:
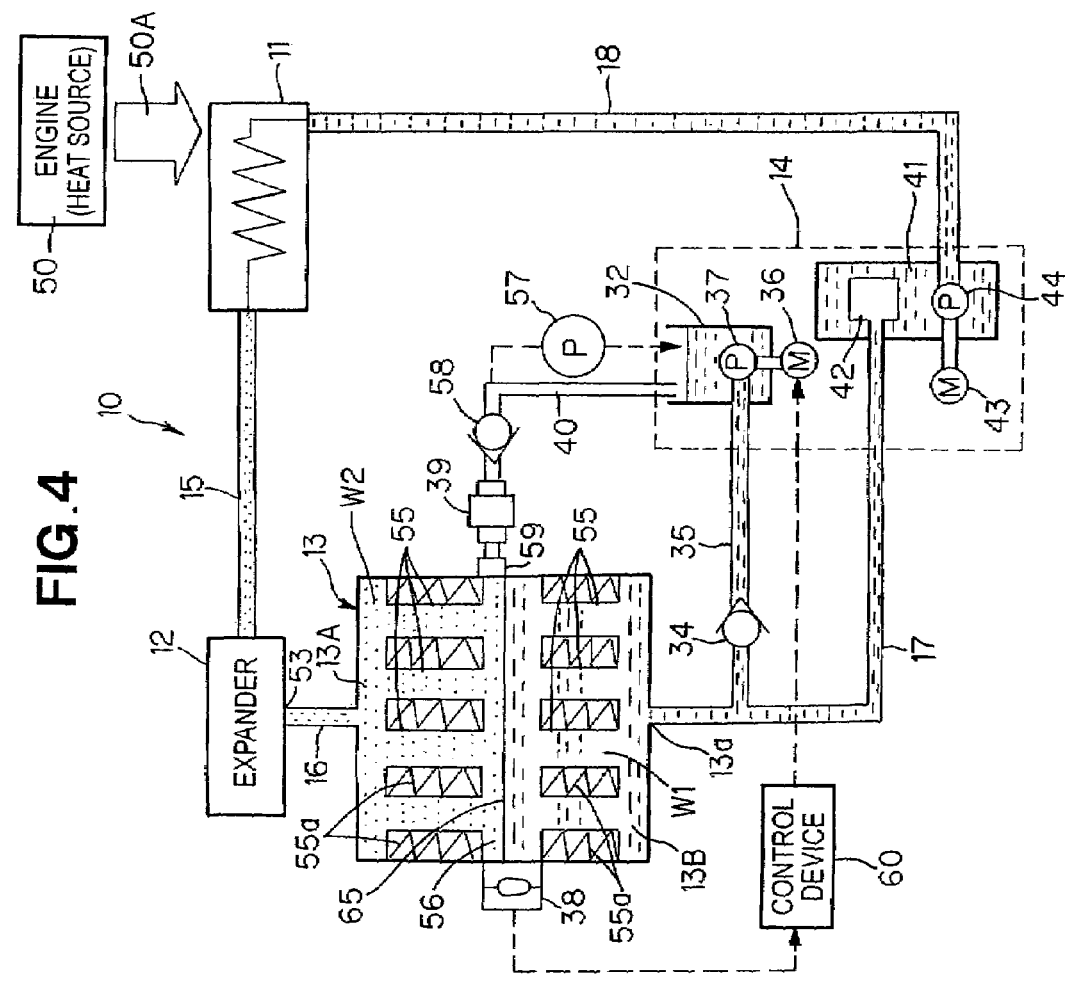
Figure 5:
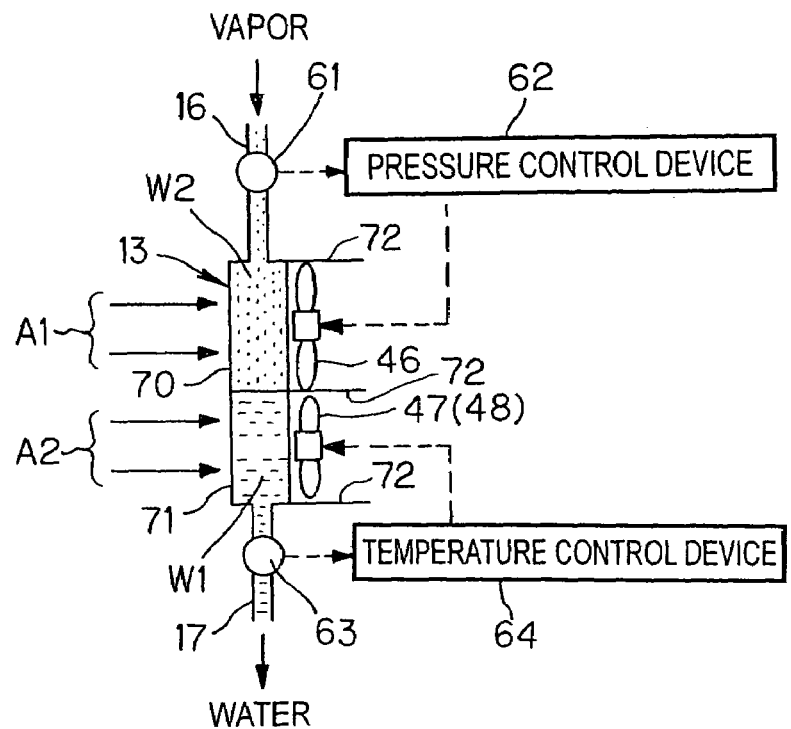
FIG. 5 is a side view showing an inner structure of a condenser and other components peripheral to the condenser in the Rankine cycle apparatus of FIG. 1.

FIG. 4 shows the system of the Rankine cycle apparatus 10 with a central focus on the condenser 13, which particularly shows a front view of the condenser 13 as taken from before the vehicle; more specifically, states of the working medium (water or condensed water W1 and water vapor W2) within the condenser 13 are illustrated. FIG. 5 is a side view of the cooling device condenser 13, which shows positional relationship among cooling fans 46, 47 and 48 provided for the condenser 13 as well as inner states of the condenser 13.

The condenser 13 includes a vapor introducing chamber 13A in its upper end portion, a water collecting chamber 13B in its lower end portion, and an intermediate chamber 56. A plurality of cooling pipes 55 are provided between the vapor introducing chamber 13A and the intermediate chamber 56 and between the intermediate chamber 56 and the water collecting chamber 13B, and these three chambers 13A, 13B and 56 are in fluid communication with each other. Cooling fins 55a are provided on the outer periphery of the cooling pipes 55.

The vapor introducing chamber 13A of the condenser 13 is connected via the pipe 16 to the vapor outlet port 53 of the expander 12, and the water collecting chamber 13B is connected via the pipe 17 to the water supplying pump unit 14. As noted earlier, the expander 12 is connected via the pipe 15 to the evaporator 11, and the water supplying pump unit 14 is connected via the pipe 18 to the evaporator 11.

The evaporator 11 receives heat 50A from the exhaust gas of the engine (heat source) 50 via the exhaust pipe 45 (see FIG. 1). Within the water supplying pump unit 14, there are included various components, such as the sealed tank 41, water coalescer 42, high-pressure water supplying pump 44, drive motor 43, open tank 32, return pump 37 and motor 36.

In the condenser 13, water vapor W2 is cooled and condensed to turn to water (condensed water) W1 and accumulated in a lower inner portion of the condenser 13. Horizontal line drawn in the figure within the intermediate chamber 56 represents a liquid level 65 (corresponding to the liquid level position P1 of FIG. 1) that indicates a liquid level position of the water W1 accumulated in the condenser 13.

The liquid level sensor 38 and intermediate discharge port 59 are provided at a position corresponding to the position of the liquid level 65. The liquid level sensor 38 outputs a detection signal, representative of the liquid level position detected thereby, to a control device 60. The control device 60 generates a motor control instruction signal on the basis of the liquid level position detection signal from the sensor 38 and sends the motor control instruction signal to the motor 36 of the return pump 37.

The air vent 39 for water vapor is coupled to the intermediate discharge port 59, and it has an output end communicating with the open tank 32 via the pipe 40 equipped with a check valve 58. Exhaust pump 57 is annexed to the pipe 40 in parallel relation thereto.

Figure 6:
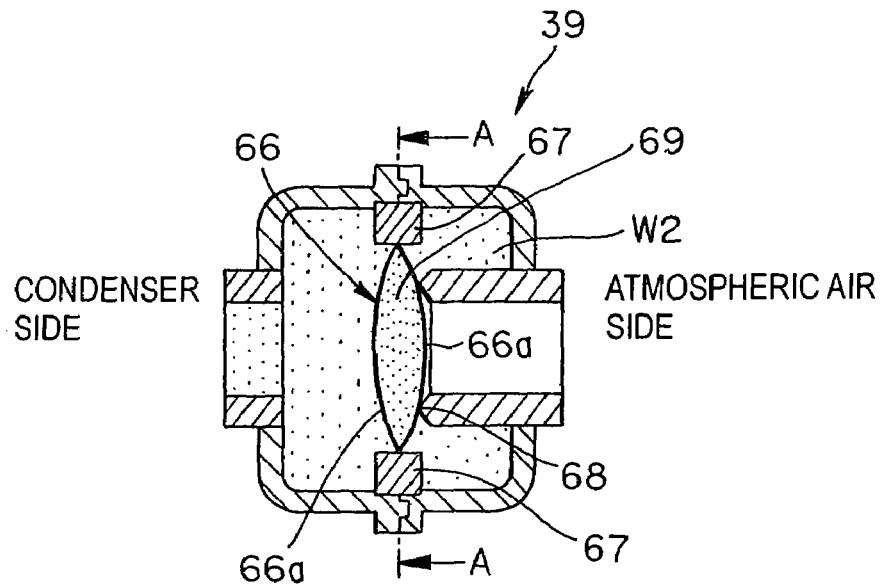
FIG. 6 is a sectional view showing a structure of an air vent in its closed position.

Further, as seen in FIG. 6, the cooling fan 46 is disposed adjacent the rear surface (right side surface in the figure) of the condenser 13 in corresponding relation to a gaseous-phase portion or vapor condensing portion 70 of the condenser 13 where the vapor W2 is accumulated, and the cooling fans 47 and 48 are disposed adjacent the rear surface of the condenser 13 in corresponding relation to a liquid-phase portion or condensed water cooling portion 71 of the condenser where the water W1 is accumulated.

The cooling operation by the cooling fan 46 is controlled by a pressure control device 62 on the basis of a vapor pressure detection signal output by a pressure sensor 61 mounted, for example, on the pipe 16 through which the vapor W2 flows. Namely, the cooling fan 46 is a vapor-condensing cooling fan to be used for vapor pressure adjustment. Further, the cooling operations by the cooling fans 47 and 48 are controlled by a temperature control device 64 on the basis of a water temperature detection signal output by a temperature sensor 63 mounted, for example, on the pipe 17 through which the water W1 flows. Namely, the cooling fans 47 and 48 are water-cooling fans to be used for cooling of the condensed water.

In FIG. 5, A1 indicates a flow of cooling air applied from before the gaseous-phase portion 70 of the condenser 13 on the basis of the rotation of the cooling fan 46, while A2 indicates a flow of cooling air applied from before the liquid-phase portion 71 of the condenser 13 on the basis of the rotation of the cooling fans 47 and 48.

As apparent from the foregoing, the gaseous-phase portion or vapor condensing portion 70 and the liquid-phase portion or condensed water cooling portion 71 in the condenser 13 are cooled independently of each other. Reference numeral 72 represents shrouds that zone or define the individual cooling regions.

Referring back to FIG. 4, the water vapor discharged from the vapor outlet port 53 of the expander 12 is substantially equivalent in pressure to the atmospheric pressure. In the intermediate chamber 56 into which the respective outlets of the upper cooling pipes (condensing pipes) 55 open, water is discharged via the air vent 39 in order to adjust the liquid level 65 to lie within the intermediate chamber 56. Further, the high-pressure water supplying pump 44 functions, as a water supplying pump of a main circulation circuit in the Rankine cycle apparatus 10, to supply a necessary amount of water to the evaporator 11.

The reserving open tank 32, which is open to the atmosphere, retains reserve water for the sealed circulation circuitry in the system. The return pump 37 supplies water into the condenser 13 in response to the detection signal from the liquid level sensor 38. The exhaust pump 57 sucks in air from the downstream end of the air vent 39 when the condenser 13 is to be operated at a negative pressure.

The above-mentioned exhaust pump 57 may be constructed to operate in response to detection of a negative pressure by the pressure sensor 61 and pressure control device 62 shown in FIG. 5, or by the control device 60 detecting via the liquid level sensor 38 when the position of the liquid level 65 rises above a predetermined upper limit.

The check valve 58 prevents a reverse flow of the atmospheric air when the interior pressure of the condenser 13 turns to a negative pressure, and the check valve 34 prevents a reverse flow of water from the condenser 13 to the return pump 37. The air vent 39 is constructed to allow water and air to pass therethrough, but prevent water vapor from passing therethrough. The intermediate discharge port 59 functions to limit variation in the position of the liquid level 65 of the condensed water, through emission of non-condensing (non-condensable) gas or overflow of the water, so that the liquid level position varies only within a predetermined vertical range.

The liquid sensor 38 outputs a position detection signal, representative of an actual current position of the liquid level 65, to the control device 60, and the control device 60 controls the return pump 37 so that the position of the liquid level 65 constantly lies within the intermediate chamber 56. More specifically, the position of the liquid level 65 is controlled to lie within a predetermined vertical range between the air vent 39 and the liquid level sensor 38. The liquid level sensor 38 may be, for example, in the form of a capacitance-type level sensor or float-type level switch.

In FIG. 5, the pressure sensor 61 detects an interior pressure of the condenser 13; basically, it detects a pressure of the water vapor W2. The pressure control device 62 operates the cooling fan 46 in such a manner that the interior pressure of the condenser 13 equals a predetermined pressure setting. The temperature sensor 63 detects a current temperature of the condensed water W1. The temperature control device 64 operates the cooling fans 47 and 48 in such a manner that the condensed water temperature equals a predetermined temperature setting.

Figure 7:
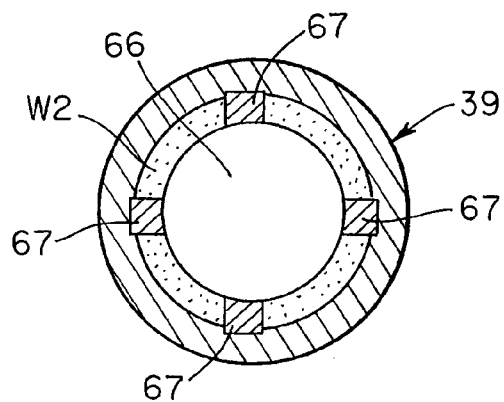
FIG. 7 is a sectional view of the air vent taken along the A—A lines of FIG. 6.
Figure 8:
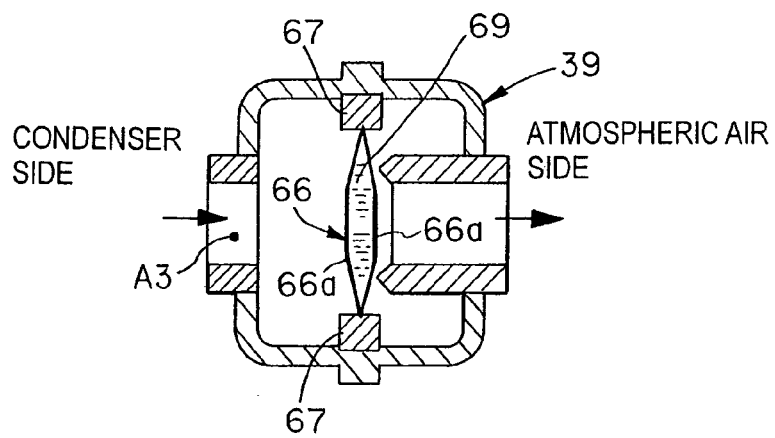
FIG. 8 is a sectional view of the air vent in an opened position.

Next, construction and behavior of the air vent 39 employed in the instant embodiment will be detailed with reference to FIGS. 6 to 8. FIG. 6 is a vertical sectional view of the air vent 39 and FIG. 7 is a sectional view of the air vent 39 taken along the A—A lines of FIG. 6, both of which show the air vent 39 in a closed position. FIG. 8 is a vertical sectional view of the air vent 39 in an opened position (i.e., valve-open position). In these figures, the left side of the air vent 39 is a side communicating with the condenser 13 (i.e., "condenser side"), while the right side of the air vent 39 is a side communicating with the atmosphere (i.e., "atmosphere side"). The air vent 39 is hermetically sealed when its interior is filled with saturated vapor (FIG. 6), automatically opened when water or non-condensing gas is present in the interior, and again hermetically sealed by discharging the water or non-condensing gas (FIG. 8).

In FIG. 6, the air vent 39 includes a valve 66 located generally centrally therein, a valve support 67 supporting the valve 66, and a valve port (packing) 68.

The valve 66 supported by the valve support 67 is positioned to close up the valve port 68 when necessary. The valve 66 comprises a pair of opposed diaphragms 66a combined to form a hermetically-sealed space therebetween, and temperature-sensitive liquid 69 is held in the sealed space. The temperature-sensitive liquid 69 has characteristics such that, like water, it is kept in the liquid phase under less than a predetermined pressure or temperature but expands as a gas once the temperature exceeds a predetermined level.

Figure 9:
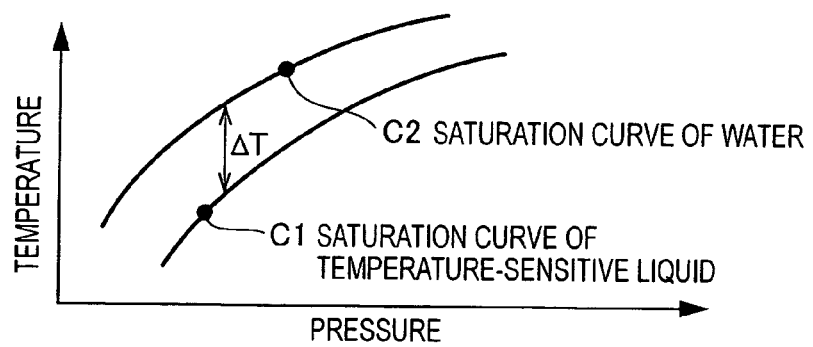
FIG. 9 is a graph showing respective saturation curves of a temperature-sensitive liquid and water.

FIG. 9 shows respective saturation curves C1 and C2 of the temperature-sensitive liquid 69 and water. The temperature at which the temperature-sensitive liquid 69 turns to the gaseous state is lower by $\Delta T$ (about 10° C.) than the temperature at which water turns to water vapor. Thus, when the interior of the air vent 39 is filled with the water vapor W2, the temperature-sensitive liquid 69 is kept in the gaseous state, so that the sealed space containing the expanded temperature-sensitive liquid 69 presses the opposed diaphragms 66a outwardly away from each other so as to close up a gap between the valve port 68 and the valve 66 comprised of the diaphragms 66a (see FIG. 6). Conversely, when the interior of the air vent 39 is at a low temperature (e.g., when non-condensing gas A3, such as air, is present in the ambient environment around the valve 66), the temperature-sensitive liquid 69 is kept in the liquid state, the opposed diaphragms 66a are pressed inwardly toward each other, so that air etc. is discharged through the gap between the valve 66 and the valve port 68 (see FIG. 8).

As apparent from the foregoing, the control device 60 shown in FIG. 4 is constructed to control the position of the liquid level 65 to vary only within the predetermined vertical range (variation width) in the condenser 13 that cools the water vapor W2 via the cooling fan 46 to convert the vapor W2 back to the water (condensed water) W1. When the detection signal output from the liquid level sensor 38, which detects a current position of the liquid level 65 that corresponds to the boundary between the gaseous-phase portion 70 and the liquid-phase portion 71 (see FIG. 4) in the condenser 13, indicates that the position of the liquid level 65 is lower than the lower limit of the predetermined range, the control device 60 controls the motor 36 of the return pump 37 that supplies water into the condenser 13, to thereby re-supply or replenish a deficient amount of water from the open tank 32 via the pipe 35 to the condenser 13.

Further, when the position of the liquid level 65 is higher than the upper limit of the predetermined range, the control device 60 discharges an excessive water to the open tank 32 via the intermediate discharge port 59, air vent 39, etc. In this way, a desirable range of the position of the liquid level 65 can be set in accordance with the range determined by the lower limit based on the detection by the liquid level sensor 38 and the upper limit based on the operation of the air vent 39.

The intermediate discharge port 59 for discharging the water (condensed water) W1 is provided in the intermediate chamber 56 of the condenser 13, in order to control the position of the liquid level 65. When the liquid level 65 is higher than the intermediate discharge port 59, the intermediate discharge port 59 causes the water to flow out therethrough to the reserving open tank 32 so that the liquid level 65 can be lowered. When the liquid level 65 is lower than the intermediate discharge port 59, the air vent 39 coupled to the intermediate discharge port 59 prevents the vapor from escaping via the water outlet 59.

As seen in FIGS. 6–8, the air vent 39 for preventing the vapor from escaping via the intermediate discharge port 59 automatically closes the valve when vapor is present or contained in its interior, but automatically opens the valve when air (non-condensing gas) or water is present.

Further, as seen in FIG. 4, the liquid level sensor 38 is provided at a position lower than the intermediate discharge port 59, and, when the position of the liquid level 65 has lowered below the liquid level sensor 38, a deficient amount of water is re-supplied or replenished from the open tank 32 by means of the return pump 37, so as to raise the liquid level 65 to the position of the liquid level sensor 38.

As set forth above, the position of the liquid level 65 is constantly kept within the vertical range between the intermediate discharge port 59 and the liquid level sensor 38. If the interval is distance between the intermediate discharge port 59 and the liquid level sensor 38 is increased, an error in heat transmission area between the vapor portion W2 and the water (condensed water) portion W1 will become greater. Conversely, if the interval between the intermediate discharge port 59 and the liquid level sensor 38 is decreased, the return pump 37 and air vent 39 have to operate very often. Therefore, it is preferable that the interval between the intermediate discharge port 59 and the liquid level sensor 38 be set within a moderate range such that both of the above two adverse influences or inconveniences can be lessened to an appropriate degree. Further, in order to keep constant the heat transmission areas, it is desirable that the interval between the intermediate discharge port 59 and the liquid level sensor 38 be as small as possible or zero.

In the instant embodiment, the air vent 39 also functions as a non-condensing gas discharge device of the condenser 13. As noted earlier, the air vent 39 includes the valve 66 attached to, i.e. operatively connected with, a part of the gaseous-phase portion 70 near the boundary between the gaseous-phase portion 70 (filled with the vapor W2) and the liquid-phase portion 71 (filled with the water W1). The valve 66 opens at a temperature below the boiling temperature of the water, so as to discharge the accumulated air (non-condensing gas) A3 staying at a temperature equal to or lower than the boiling temperature of the water. Preferably, the valve-opening temperature of the air vent 39 is lower than the boiling temperature of the water as the liquid-phase working medium.

As described above in relation to FIG. 4, the condenser 13 includes the intermediate chamber 56, and the air vent 39 is operatively connected with the intermediate chamber 56. The air vent 39 discharges the water W1 so that the liquid level 65 within the condenser 13 is kept at least below the air vent 39.

Figure 10:
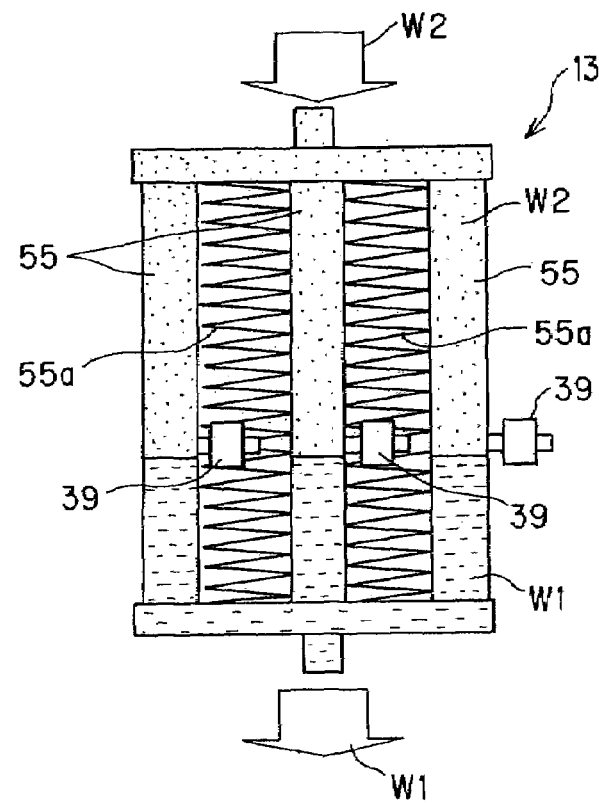
FIG. 10 is a front view of a modification of the condenser.

Alternatively, the intermediate chamber 56 may be dispensed with as illustrated in FIG. 10, in which case it is preferable that a separate air vent 39 be provided for each of the plurality of cooling pipes (condensing pipes) 55.

Figure 11:
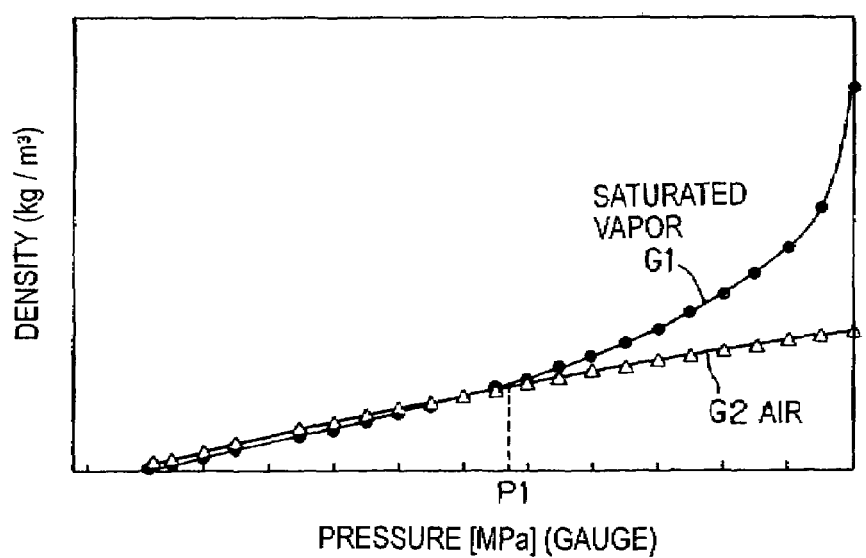
FIG. 11 is a graph showing variation characteristics of vapor and air densities relative to pressure variation.
Figure 12:
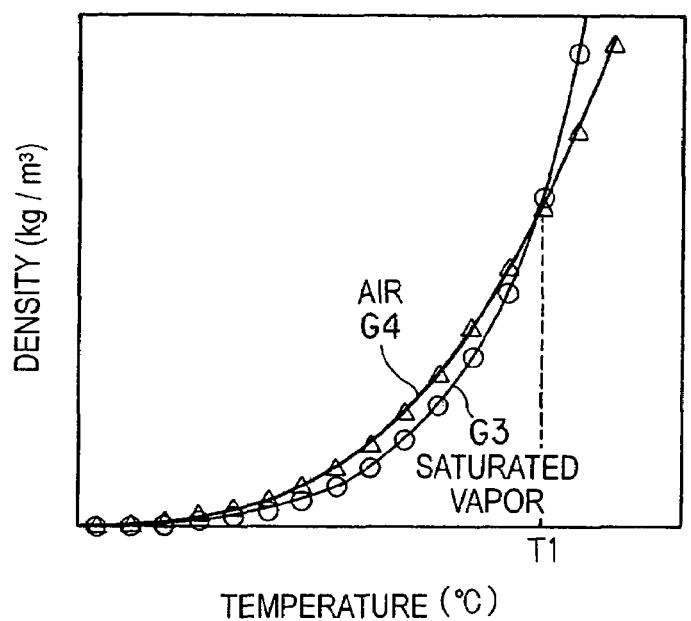
FIG. 12 is a graph showing variation characteristics of vapor and air densities relative to temperature variation.

The reason why the non-condensing gas (i.e., air in this case) accumulates beneath the vapor W2 within the cooling pipes 55 is explained below with reference to FIGS. 11 and 12. In FIG. 11, the horizontal axis represents pressure, while the vertical axis represents density. In FIG. 12, the horizontal axis represents temperature, while the vertical axis represents density. Specifically, FIG. 11 shows a curve G1 representative of variation in the vapor density relative to variation in the pressure, and a curve G2 representative of variation in the air density relative to variation in the pressure. FIG. 12 shows a curve G3 representative of variation in the vapor density relative to variation in the temperature, and a curve G4 representative of variation in the air density relative to variation in the temperature.

As illustrated in FIG. 11, the vapor density is greater than the air pressure when the pressure is higher than a pressure level P1. When the pressure is lower than the level P1, the air density is greater than the vapor density. As illustrated in FIG. 12, the vapor density is greater than the air pressure when the temperature pressure is higher than a temperature level T1. When the temperature is lower than the level T1, the air density is greater than the vapor density.

The pressure within the condenser 13 is set to be lower than the level P1, and the temperature within the condenser 13 is set to be lower than the level T1. Thus, within the condenser 13, the air is heavier than the vapor and thus accumulates beneath the vapor.

Because the non-condensing gas or air A3 accumulates in the lower area of the gaseous-phase portion 70 within the condenser 13, the air vent 39 has an air outlet that is located in the lowermost area of the gaseous-phase portion 70 (as close to the liquid level of the condensed water as possible) in order to discharge the air from the condenser 13 efficiently.

Further, as explained in relation to FIGS. 6 to 8, the air vent 39 is a selective discharge valve which is automatically brought to its closed position (valve-closed position) when its predetermined installed portion is filled with the vapor W2 and automatically brought to its opened position (valve-open position) when the water W1 or non-condensing gas A3 is present in the predetermined installed portion. When the condenser 13 is to be operated at a pressure higher than the atmospheric pressure, the downstream side of the air vent 39 is opened to the atmospheric pressure so that the air is automatically discharged into the atmospheric air. When the condenser 13 is to be operated at a negative pressure, on the other hand, the exhaust pump 57 located downstream of the air vent 39 sucks in the air from the downstream side of the air vent 39, so that the air can be discharged into the atmospheric air.

Figure 13:
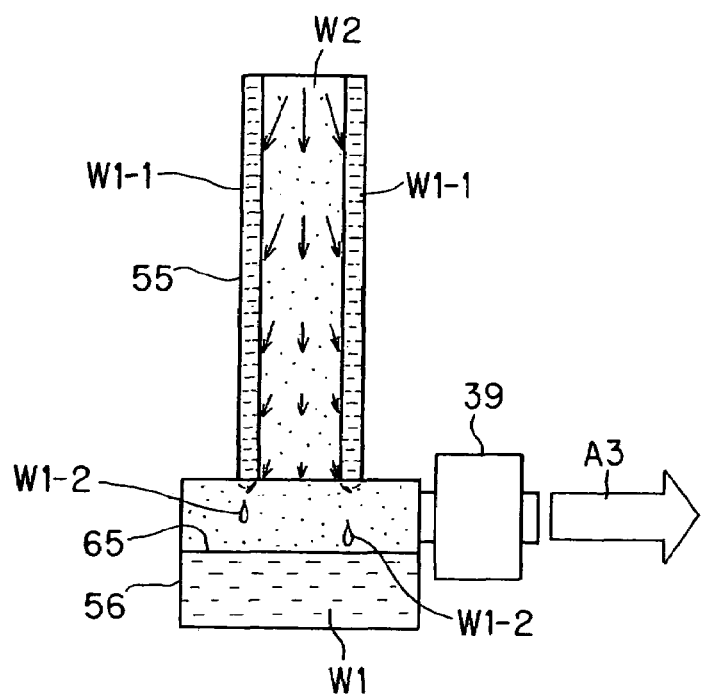
FIG. 13 is an enlarged sectional view of the air vent and portions peripheral to the air vent.

FIG. 13 is an enlarged schematic view of the intermediate chamber 56 with the air vent 39 attached thereto, which particularly shows how the air A3 is discharged via the air vent 39 functioning as the non-condensing gas discharge device of the condenser 13.

In FIG. 13, the vapor W2 condenses on the inner wall surface of the cooling pipes 55 (only one of which is shown) to form a condensate liquid membrane W1-1, and then moves downward as condensate liquid drops W1-2 so that it is received in the intermediate chamber 56 as water W1.

The air A3 present or contained within the cooling pipes 55 is discharged through the air vent 55 located above the liquid level 65. Because the air A3 is present within all of the cooling pipes 55, it is necessary that the air A3 be discharged from all of the cooling pipes 55.

Alternatively, where the number of the cooling pipes 55 is relatively small, a separate air vent 39 may be provided in correspondence with, or operatively connected with, each of the cooling pipes 55, as illustrated in FIG. 10. Where, on the other hand, a relatively great number of the cooling pipes 55 are employed, a single air vent 39 may be operatively connected with the intermediate chamber 56 in such a manner that the air A3 is discharged collectively through the same or common air vent 39, as described above illustrated in FIGS. 4 and 13. In this way, the gaseous-phase portion 70 of the condenser 13 is filled only with the vapor, which can thereby achieve an enhanced condensing efficiency.

In order to discharge the air A3 from the condenser 13, the liquid level 65 of the condensed water W1 is adjusted to be in the intermediate chamber 56 and lower than the installed portion of the air vent 39. Control of the liquid level position will be described in greater detail later.

In the above-described manner, the gaseous-phase portion 70 of the condenser 13 can be completely filled with the vapor, so that the condenser 13 can constantly operate with an enhanced heat exchange performance; as a result, the condenser 13 can be effectively reduced in size and can operate with reduced power consumption.

FIG. 14A shows positional relationship among the liquid level sensor 38, the air vent 39 and the liquid level 65 in the Rankine cycle apparatus, and FIG. 14B shows relationship among the liquid level 65 and operational states of the air vent 39 and return pump 37.

In FIG. 14A, $H_A$, $H_B$ and $H_L$ represent the upper-limit position of the liquid level, lower-limit liquid level and position of the liquid level 65, respectively. When the actual position $H_L$ of the liquid level 65 is higher than the upper-limit position $H_A$, the air vent 39 is set in its opened position, and the return pump 37 (see FIG. 4) is set in its OFF state. When the position $H_L$ of the liquid level 65 is between the upper-limit and lower-limit positions $H_A$ and $H_B$ of the liquid level, the air vent 39 is set in its closed position (i.e., valve-closed position), and the return pump 37 (see FIG. 4) is set in its OFF state. When the position $H_L$ of the liquid level 65 is lower than the lower-limit positions $H_B$, the air vent 39 is set in its closed position, and the return pump 37 (see FIG. 4) is set in its ON state. In this way, variation in the liquid level 65 can be reliably confined within the range between the upper-limit and lower-limit positions $H_A$ and $H_B$.

Also, even when the inflow amount (mass flow rate) of water vapor or the amount of water discharge (mass flow rate) to the high-pressure water supplying pump 44 varies at the time of activation/deactivation or transient variation of the Rankine cycle apparatus 10, the described arrangements of the instant embodiment can effectively restrict or control variation of the position of the liquid level 65 within the condenser 13 and thereby permits stable operation of the condenser 13.

Further, as illustrated in FIG. 4, the Rankine cycle apparatus 10 includes the reserving open tank 32 open to the atmosphere and provided separately from the main circulation circuit. This open tank 32 is connected to the condenser 13, via the air vent 39 coupled to the intermediate discharge port 59 and the check valve 58. Lower portion of the open tank 32 is connected to the outlet port 13a of the condenser 13 via the return pump 37, pipe 35 and check valve 34.

When the liquid level 65 is higher in position than the intermediate discharge port 59, the water overflows out of the condenser 13 to be directed into the open tank 32, while, when the liquid level 65 is lower in position than the liquid level sensor 38, the return pump 37 is activated to replenish water to the condenser 13. Because the amount of water supply by the high-pressure water supplying pump 44, located downstream of the condenser 13, is controlled in the instant embodiment, the activation of the return pump 37 causes the liquid level 65 to rise up to the position of the liquid level sensor 38 due to the water supply into the condenser 13, upon which the return pump 37 is deactivated.

Further, because the intermediate chamber 56, into which the plurality of cooling pipes (condensing pipes) 55 open, is provided in the region including the intermediate discharge port 59 and liquid sensor 38, the liquid level 65 is allowed to vary with improved response and in a stabilized manner during water discharge from the intermediate discharge port 59 or water supply from the return pump 37.

Note that the provision of the intermediate chamber 56 is not necessarily essential to the present invention if the vapor introducing chamber 13A and water collecting chamber 13B are in fluid communication with each other via the plurality of cooling pipes (condensing pipes) 55.

Operational sequence of the liquid level position control performed by the control device 60 is explained below with reference to a flow chart of the FIG. 15.

At step S10, the control device 60 reads the current position HL of the liquid level 65 via the liquid level sensor 38.

At step S11, it is determined whether the liquid level position $H_L$ is higher than the upper-limit position $H_A$ of the liquid level, and, if so, control proceeds to step S12, where the air vent 39 is brought to its opened position to discharge the excessive water so as to lower the liquid level 65. After that, the control device 60 reverts to step S10. When the liquid level position $H_L$ is lower than the upper-limit position $H_A$ of the liquid level, control proceeds to step S13 in order to close the air vent 39.

At step S14, it is determined whether the liquid level position HL is lower than the lower-limit position $H_B$ of the liquid level, and, if so, control proceeds to step S15, where the return pump 37 is turned on for re-supply or replenishment of deficient water. Further, if the liquid level position $H_L$ is higher than the lower-limit position $H_B$ of the liquid level, the return pump 37 is turned off to not replenish water. After that, the control device 60 reverts to step S10.

Figure 16:
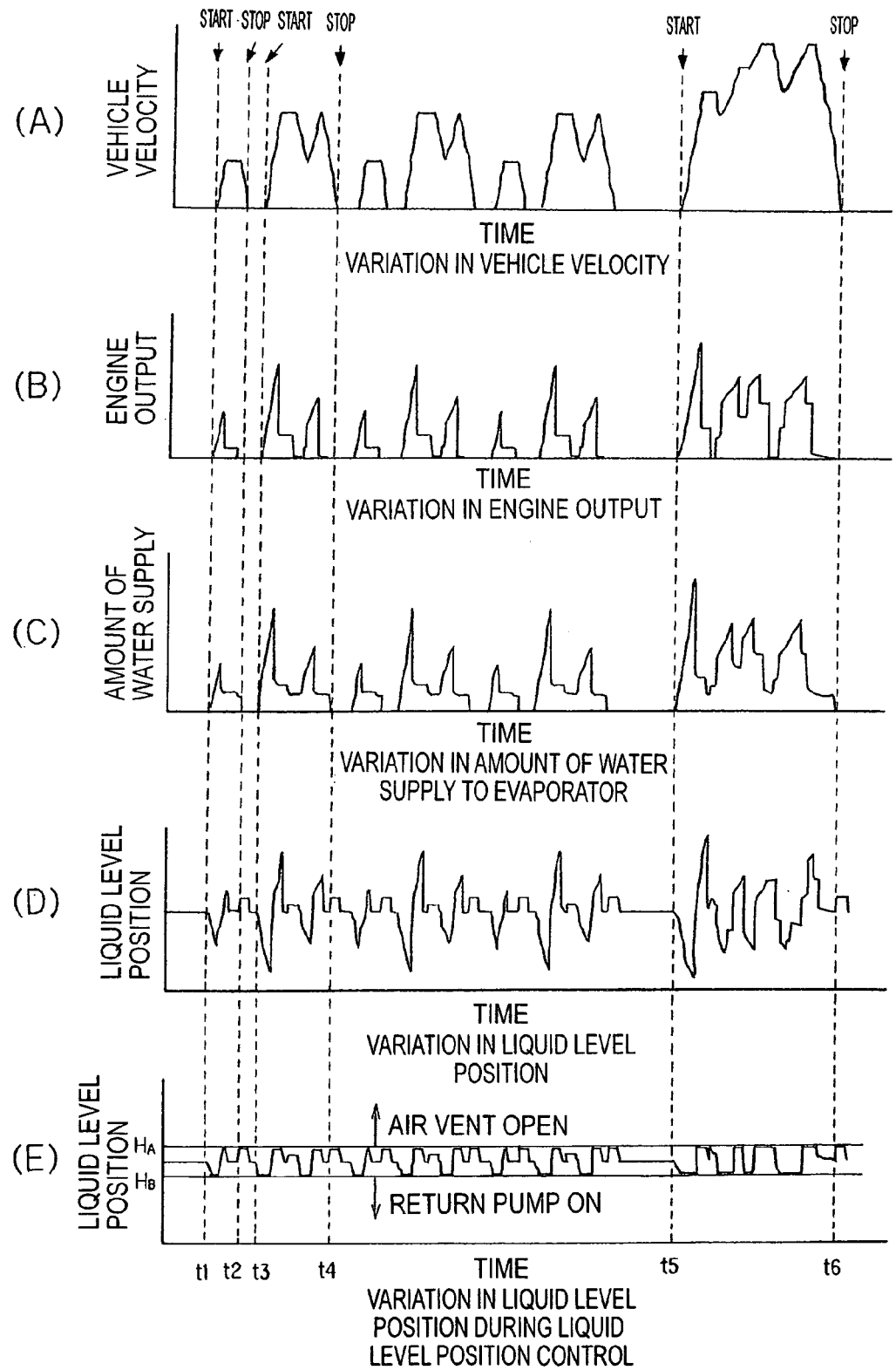
FIG. 16 is a timing chart showing variation in a traveling velocity of the vehicle having the Rankine cycle apparatus mounted thereon, variation in an engine output, variation in an amount of water supply to an evaporator and variation in the liquid level position within the condenser.

FIG. 16 is a timing chart showing variation in the velocity of the vehicle having the Rankine cycle apparatus 10 mounted thereon, variation in the engine output, variation in the amount of water supply to the evaporator and variation in the liquid level position within the condenser, in contradistinction to the conventional apparatus. More specifically, section (A) of FIG. 16 shows variation in the traveling velocity of the vehicle, (B) variation in the engine output of the vehicle, (C) variation in the amount of water supply to the evaporator in the conventional apparatus, (D) variation in the liquid level position within the condenser in the conventional apparatus, and (E) variation in the liquid level position within the condenser in the embodiment of the present invention.

As the velocity of the vehicle, having the Rankine cycle apparatus mounted thereon, varies as illustrated in (A) of FIG. 16, the engine output of the vehicle varies as illustrated in (B) of FIG. 16, in response to which the amount of water supply to the evaporator varies in a manner as illustrated in (C) of FIG. 16 and also the liquid level position within the condenser varies in a manner as illustrated in (D) of FIG. 16. In other words, as the vehicle starts traveling at time points t1, t3 and t5 and stops traveling at time points t2, t4 and t6 along the time axis, the engine output varies and the amount of water supply to the evaporator also varies, so that the liquid level position within the condenser varies.

Figure 17:
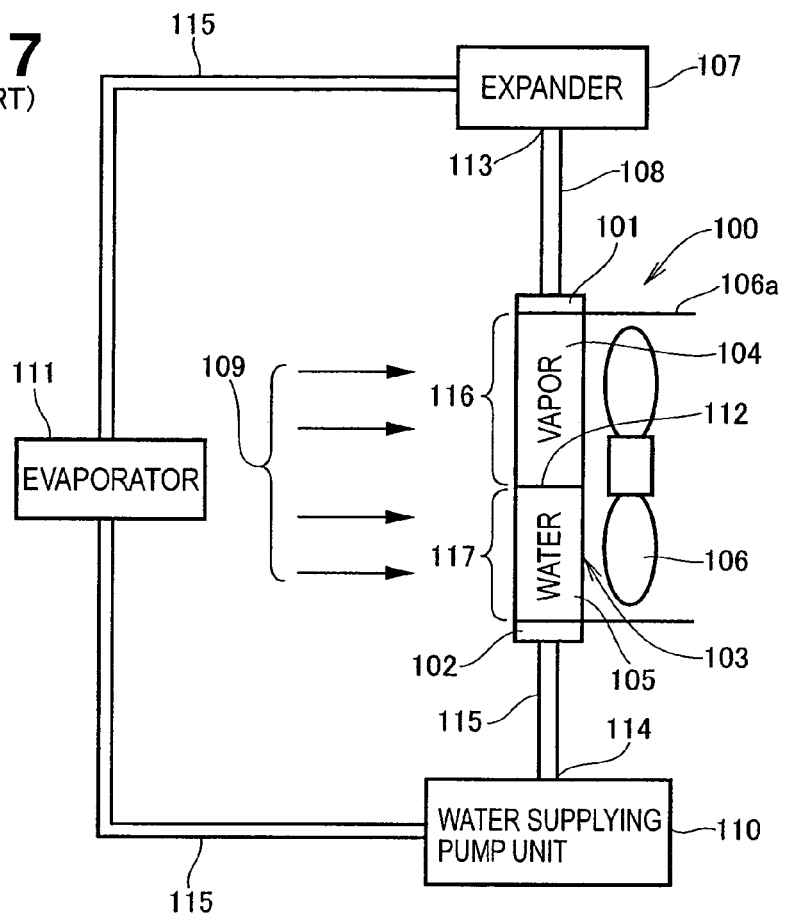
FIG. 17 is a schematic view of a conventional vehicle-mounted Rankine cycle apparatus.
Figure 18:
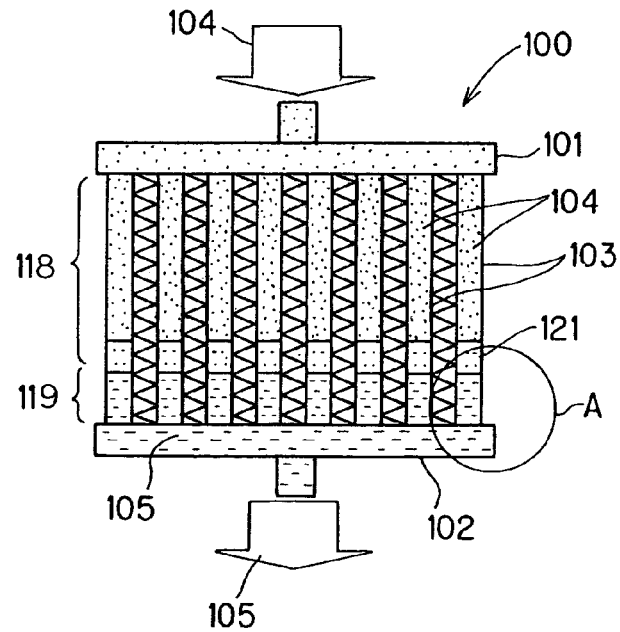
FIG. 18 is a front view of a conventional condenser.
Figure 19:
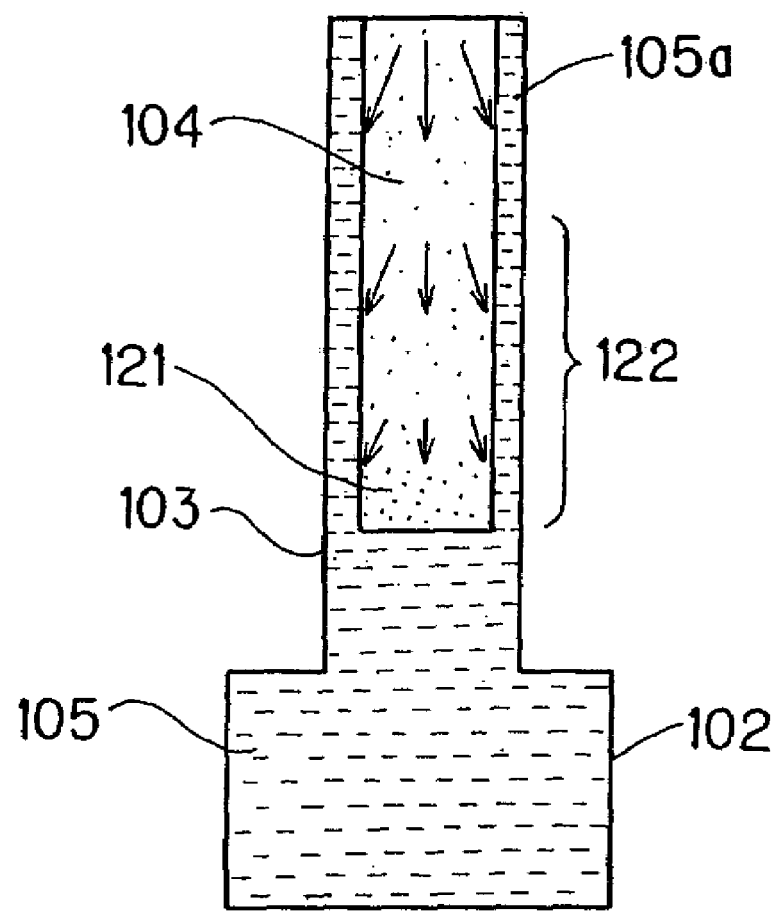
FIG. 19 is an enlarged sectional view of an "A" portion of the condenser shown in FIG. 18.

With the condenser 100 of the conventional vehicle-mounted Rankine cycle apparatus shown in FIG. 17, the amount of water supply to the evaporator 111 varies because the engine output varies as illustrated in (B) of FIG. 16 in response to the start/stop of the vehicle and transitional vehicle velocity variation as illustrated in (A) of FIG. 16, so that the liquid level position 112 in the cooling pipes 103 of the condenser 100 would vary. Namely, in the condenser 100, the liquid level position 112 rises when the inflow amount of vapor is greater than the discharge amount of condensed water, but falls when the inflow amount of vapor is smaller than the discharge amount of condensed water.

By contrast, according to the instant embodiment, the above-described liquid level position control is performed when the vehicle varies in traveling velocity as illustrated in (A) of FIG. 16, and thus, the liquid level position can be controlled to vary between the upper-limit and lower-limit positions $H_A$ and $H_B$ at the time of a start/stop of traveling of the vehicle. As a consequence, the instant embodiment can reliably prevent great variation or fluctuation in the liquid level position within the condenser 13.

In the present invention, as set forth above, the positional variation in the liquid level 65 of the water (condensed water) W1 accumulated in the condenser 13 is confined to the predetermined range, so that respective variation of the heat transmission areas of the gaseous-phase portion and liquid-phase portion, corresponding to vapor and condensed water, in the condenser 13 can be effectively reduced. As a consequence, the present invention can perform the necessary cooling without regard to variation in the heat transmission areas and achieve an enhanced accuracy of the control. Also, the present invention can reduce cavitations in the pump device and extra heat energy consumption during re-heating in the evaporator 11.

Further, the present invention can keep a variation width of the heat transmission areas within a permissible range and impart a hysteresis to switching between discharge and replenishment of the liquid-phase working medium, to thereby lower the frequency of the switching operation. As a result, the present invention can achieve stabilized operation of the condenser 13 and enhanced durability of devices involved in the discharge and replenishment of the liquid-phase working medium.

Moreover, because the present invention can appropriately control the liquid level by discharging the liquid-phase working medium (water) from within the condenser 13 while preventing discharge of the gaseous-phase working medium (vapor), it can achieve even further stabilized operation of the condenser 13.

Furthermore, the present invention can replenish the liquid-phase working medium directly up to the set liquid level from the reserving open tank, accumulating the liquid-phase working medium, via the return pump, so that the liquid level position can be appropriately adjusted and accurately stabilized promptly through high-response and high-precision supply amount control of the pump.

In addition, the present invention can perform the liquid level position control while keeping the necessary total mass flow rate of the working medium in the circulation circuitry, and thus, the circulation circuitry need not be equipped with particular devices indented for working medium discharge and replenishment to and from the outside.

Furthermore, the present invention can reduce differences in the liquid level position among the cooling pipes of the condenser and thereby accurately stabilize the liquid level promptly during the discharge and replenishment of the liquid-phase working medium, as a result of which the present invention can achieve even further stabilized operation of the condenser 13.

Obviously, various minor changes and modifications of the present invention are possible in the light of the above teaching. It is therefore to be understood that within the scope of the appended claims the invention may be practiced otherwise than as specifically described.

What is claimed is:

1. A non-condensing gas discharge device of a condenser, which comprises:
    a gaseous-phase portion containing a condensable gaseous-phase working medium and a non-condensing gas;
    a liquid-phase portion containing a liquid-phase working medium;
    cooling means for cooling the working medium to convert the gaseous-phase working medium back to the liquid phase; and
    a valve device, provided in correspondence with a part of said gaseous-phase portion near a liquid level of the liquid-phase working medium along a boundary between said gaseous-phase portion and said liquid-phase portion, for separating the non-condensing gas from the gaseous-phase working medium and thereby selectively discharging only the non-condensing gas.

2. A non-condensing gas discharge device as claimed in claim 1 wherein said valve device is brought to an opened position at a temperature lower than a boiling temperature of the liquid-phase working medium, so as to selectively discharge the non-condensing gas of a temperature lower than the boiling temperature.

3. A non-condensing gas discharge device as claimed in claim 1 wherein said condenser includes a plurality of condensing pipes and an intermediate chamber communicating with said plurality of condensing pipes, and said valve device is provided in correspondence with said intermediate chamber.

4. A non-condensing gas discharge device as claimed in claim 1 wherein said condenser includes a plurality of condensing pipes, and a plurality of said valve devices are provided in corresponding relation to said plurality of condensing pipes.

5. A non-condensing gas discharge device as claimed in claim 1 wherein said liquid-phase working medium is water, said gaseous-phase working medium is vapor, and said non-condensing gas is air.

6. A non-condensing gas discharge device as claimed in claim 5 wherein said valve device has an outlet for discharging the water, and the liquid level of the water lies below said outlet.

7. A non-condensing gas discharge device as claimed in claim 1 wherein said valve device is an air vent.

\* \* \* \* \*